(12) United States Patent
Hamlin et al.

(10) Patent No.: US 10,730,436 B2
(45) Date of Patent: Aug. 4, 2020

(54) VEHICULAR OUTSIDE REARVIEW ASSEMBLY

(71) Applicant: Gentex Corporation, Zeeland, MI (US)

(72) Inventors: Bradley R. Hamlin, Allendale, MI (US); Nigel T. Lock, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/858,563

(22) Filed: Dec. 29, 2017

(65) Prior Publication Data

US 2018/0186292 A1 Jul. 5, 2018

Related U.S. Application Data

(60) Provisional application No. 62/441,016, filed on Dec. 30, 2016.

(51) Int. Cl.
*G02F 1/153* (2006.01)
*B60R 1/06* (2006.01)
(Continued)

(52) U.S. Cl.
CPC .............. *B60R 1/06* (2013.01); *B60Q 1/2665* (2013.01); *B60R 1/082* (2013.01); *B60R 1/088* (2013.01);
(Continued)

(58) Field of Classification Search
CPC .... B60R 2001/1292; B60R 2001/1284; B60R 2001/1276; B60R 2001/1269;
(Continued)

(56) References Cited

U.S. PATENT DOCUMENTS

| 4,798,967 A | 1/1989 | Yamana et al. |
| 5,557,476 A | 9/1996 | Oishi |

(Continued)

FOREIGN PATENT DOCUMENTS

| CN | 104742807 A | 7/2015 |
| CN | 204472689 U | 7/2015 |

(Continued)

OTHER PUBLICATIONS

Extended European Search Report dated Sep. 11, 2019, for corresponding European application No. 17886021.9, 6 pages.

*Primary Examiner* — William R Alexander
*Assistant Examiner* — Tamara Y. Washington
(74) *Attorney, Agent, or Firm* — Price Heneveld LLP; Bradley D. Johnson

(57) ABSTRACT

A rearview assembly includes a housing having a front defining an opening. An external band extends laterally about a rear of the housing. A turn signal is defined in the external band. An electro-optic device includes a front substrate defining a first surface and a second surface. A rear substrate defines a third surface and a fourth surface. An electro-optic medium is disposed between the front substrate and the rear substrate. A peripheral seal contains the electro-optic medium between the front substrate and the rear substrate. An imager is adjacent the electro-optic device. A viewing window is disposed on an outboard corner of the electro-optic device. The imager is in optical communication with the viewing window.

20 Claims, 14 Drawing Sheets

(51) Int. Cl.
| | | |
|---|---|---|
| *B60R 1/12* | (2006.01) | |
| *B60R 1/08* | (2006.01) | |
| *G02F 1/161* | (2006.01) | |
| *G02F 1/15* | (2019.01) | |
| *G08G 1/16* | (2006.01) | |
| *B60Q 1/26* | (2006.01) | |
| *H04N 7/18* | (2006.01) | |

(52) U.S. Cl.
CPC .............. *B60R 1/1207* (2013.01); *G02F 1/15* (2013.01); *G02F 1/153* (2013.01); *G02F 1/161* (2013.01); *G08G 1/167* (2013.01); *H04N 7/188* (2013.01); *B60R 2001/1215* (2013.01); *B60R 2001/1223* (2013.01); *B60R 2001/1253* (2013.01); *G02F 2201/56* (2013.01)

(58) Field of Classification Search
CPC .... B60R 2001/1261; B60R 2001/1253; B60R 2001/1246; B60R 2001/1238; B60R 2001/123; B60R 2001/1223; B60R 2001/1215; B60R 1/1207; B60R 1/1205; B60R 1/10; B60R 1/08; B60R 1/07; B60R 1/06; B60R 1/04; B60R 1/025; B60R 1/02; B60R 1/00
See application file for complete search history.

(56) References Cited

U.S. PATENT DOCUMENTS

| | | | |
|---|---|---|---|
| 5,669,705 | A | 9/1997 | Pastrick et al. |
| 5,923,457 | A | 7/1999 | Byker et al. |
| 6,195,194 | B1 | 2/2001 | Roberts et al. |
| 6,244,716 | B1 | 6/2001 | Steenwyk et al. |
| 6,630,888 | B2 | 10/2003 | Lang et al. |
| 7,195,381 | B2* | 3/2007 | Lynam .................. B60K 35/00 362/494 |
| 7,324,261 | B2 | 1/2008 | Tonar et al. |
| 7,821,696 | B2* | 10/2010 | Tonar ...................... C09K 9/02 359/267 |
| 7,937,667 | B2* | 5/2011 | Kramer .................. B60K 35/00 715/781 |
| 8,366,284 | B2 | 2/2013 | Flynn et al. |
| 8,976,247 | B1* | 3/2015 | Karner ................ B29C 45/0017 348/148 |
| 9,019,090 | B2* | 4/2015 | Weller ...................... B60R 1/12 340/425.5 |
| 9,057,875 | B2 | 6/2015 | Fish, Jr. et al. |
| 9,073,491 | B2* | 7/2015 | McCabe .................. F21S 43/14 |
| 2005/0232469 | A1* | 10/2005 | Schofield ........... G06K 9/00818 382/104 |
| 2006/0106518 | A1* | 5/2006 | Stam .................... B60Q 1/1423 701/49 |
| 2009/0243824 | A1* | 10/2009 | Peterson .................. B60R 1/12 340/435 |
| 2010/0253489 | A1* | 10/2010 | Cui ....................... G01S 13/723 340/425.5 |
| 2010/0253492 | A1* | 10/2010 | Seder .................... G01S 13/723 340/435 |
| 2010/0253493 | A1* | 10/2010 | Szczerba ............... G01S 13/723 340/435 |
| 2010/0253526 | A1* | 10/2010 | Szczerba ............... B60K 28/066 340/576 |
| 2010/0253539 | A1* | 10/2010 | Seder .................... G01S 13/723 340/903 |
| 2010/0253540 | A1* | 10/2010 | Seder ....................... B60R 1/00 340/905 |
| 2010/0253541 | A1* | 10/2010 | Seder .................... G01S 13/723 340/905 |
| 2010/0253542 | A1* | 10/2010 | Seder ....................... G01S 7/22 340/932.2 |
| 2010/0253543 | A1* | 10/2010 | Szczerba ................ B60Q 9/005 340/932.2 |
| 2010/0253593 | A1* | 10/2010 | Seder .................... G01S 13/723 345/7 |
| 2010/0253594 | A1* | 10/2010 | Szczerba ............... G01S 13/723 345/7 |
| 2010/0253595 | A1* | 10/2010 | Szczerba ............... G01C 21/365 345/7 |
| 2010/0253596 | A1* | 10/2010 | Szczerba ............... G01S 13/723 345/7 |
| 2010/0253597 | A1* | 10/2010 | Seder ....................... B60R 1/00 345/7 |
| 2010/0253598 | A1* | 10/2010 | Szczerba ............... G01S 13/723 345/7 |
| 2010/0253599 | A1* | 10/2010 | Szczerba ............... G01S 13/723 345/7 |
| 2010/0253600 | A1* | 10/2010 | Seder .................. B32B 17/10036 345/7 |
| 2010/0253601 | A1* | 10/2010 | Seder .................... G01S 13/723 345/7 |
| 2010/0253602 | A1* | 10/2010 | Szczerba ............... G01S 13/723 345/8 |
| 2010/0253688 | A1* | 10/2010 | Cui ....................... G01S 13/723 345/443 |
| 2010/0253918 | A1* | 10/2010 | Seder .................... G01S 13/723 353/13 |
| 2010/0254019 | A1* | 10/2010 | Cui ....................... G01S 13/723 359/633 |
| 2010/0289632 | A1* | 11/2010 | Seder .................... G01S 13/723 340/436 |
| 2010/0292886 | A1* | 11/2010 | Szczerba ............... G01C 21/365 701/31.4 |
| 2012/0072080 | A1* | 3/2012 | Jeromin ................. B60Q 1/143 701/49 |
| 2014/0015972 | A1 | 1/2014 | Hoek |
| 2015/0224934 | A1 | 8/2015 | Foote et al. |
| 2015/0232028 | A1 | 8/2015 | Reardon |
| 2018/0056871 | A1* | 3/2018 | Karner ...................... B60R 1/06 |
| 2018/0170265 | A1 | 6/2018 | Boehm |
| 2018/0186292 | A1* | 7/2018 | Hamlin ................... B60R 1/088 |
| 2019/0273896 | A1* | 9/2019 | Schofield ............. B60W 30/143 |
| 2019/0283673 | A1* | 9/2019 | Karner .................... G08G 1/165 |

FOREIGN PATENT DOCUMENTS

| | | |
|---|---|---|
| JP | 2016030495 A | 3/2016 |
| KR | 20120009153 A | 2/2012 |
| WO | 1998044386 A1 | 10/1998 |
| WO | 2001064481 A2 | 9/2001 |

\* cited by examiner

VEHICULAR OUTSIDE REARVIEW ASSEMBLY

CROSS-REFERENCE TO RELATED APPLICATION

This application claims priority to and the benefit under 35 U.S.C. § 119(e) of U.S. Provisional Application No. 62/441,016, filed on Dec. 30, 2016, entitled "VEHICULAR OUTSIDE REARVIEW ASSEMBLY," the disclosure of which is hereby incorporated herein by reference in its entirety.

FIELD OF THE DISCLOSURE

The present disclosure generally relates to a rearview assembly, and particularly to a vehicular outside rearview assembly.

SUMMARY OF THE DISCLOSURE

According to one aspect of the present disclosure, a rearview assembly includes a housing having a front defining an opening. An external band extends laterally about a rear of the housing. A turn signal is defined in the external band. An electro-optic device includes a front substrate defining a first surface and a second surface. A rear substrate defines a third surface and a fourth surface. An electro-optic medium is disposed between the front substrate and the rear substrate. A peripheral seal contains the electro-optic medium between the front substrate and the rear substrate. An imager is adjacent the electro-optic device. A viewing window is disposed on an outboard corner of the electro-optic device. The imager is in optical communication with the viewing window.

According to another aspect of the present disclosure, a rearview assembly includes a housing having a front defining an opening. An external band extends laterally about a rear of the housing and a turn signal is defined in the external band. An electro-optic device disposed within the housing, the electro-optic device operable between a darkened state and a clear state. An imager is adjacent the electro-optic device; and a viewing window is disposed on an outboard corner of the electro-optic device, wherein the imager is in optical communication with the viewing window.

According to still another aspect of the present disclosure, an external rearview assembly for a vehicle includes a housing and an external band extending laterally about a rear of the housing. An electro-optic device is disposed within the housing. The electro-optic device includes a front substrate and a rear substrate wherein the rear substrate defines a recess. An imager is adjacent the electro-optic device; and a viewing window is disposed on an outboard corner of the electro-optic device. The viewing window extends through the front substrate proximate the recess of the rear substrate. The imager is in optical communication with the viewing window.

These and other features, advantages, and objects of the present disclosure will be further understood and appreciated by those skilled in the art by reference to the following specification, claims, and appended drawings.

DETAILED DESCRIPTION

Figure 1:
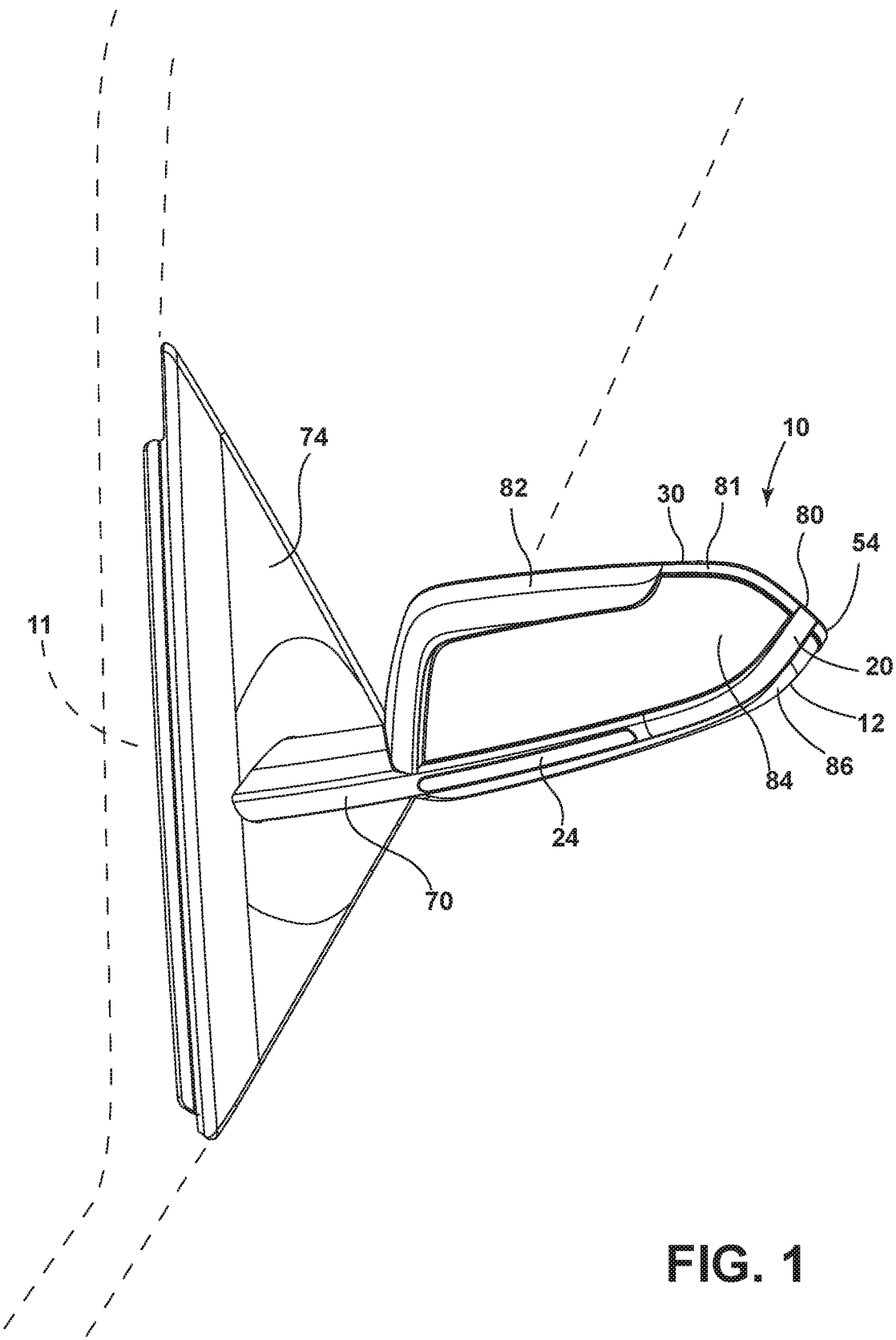
FIG. 1 is a top perspective view of one embodiment of a rearview assembly of the present disclosure.
Figure 2:
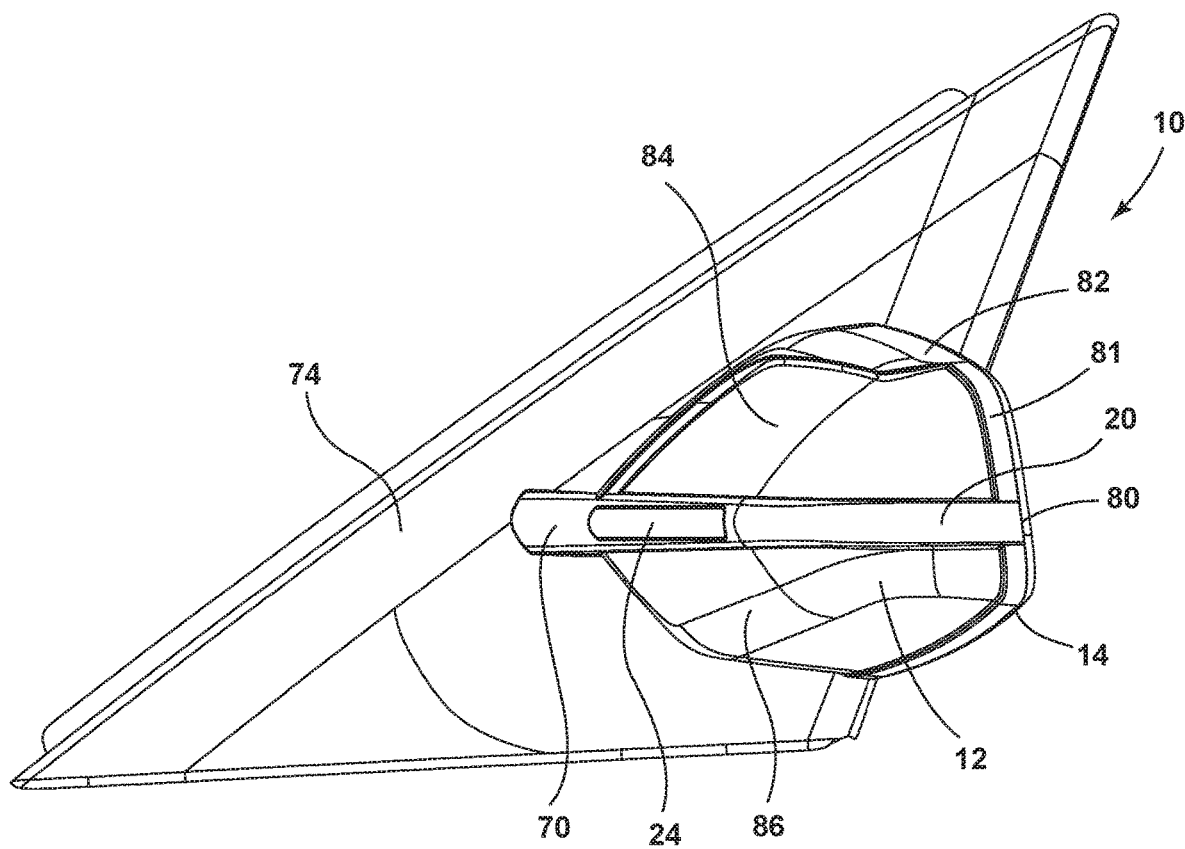
FIG. 2 is a side elevational view of the rearview assembly of FIG. 1.
Figure 3:
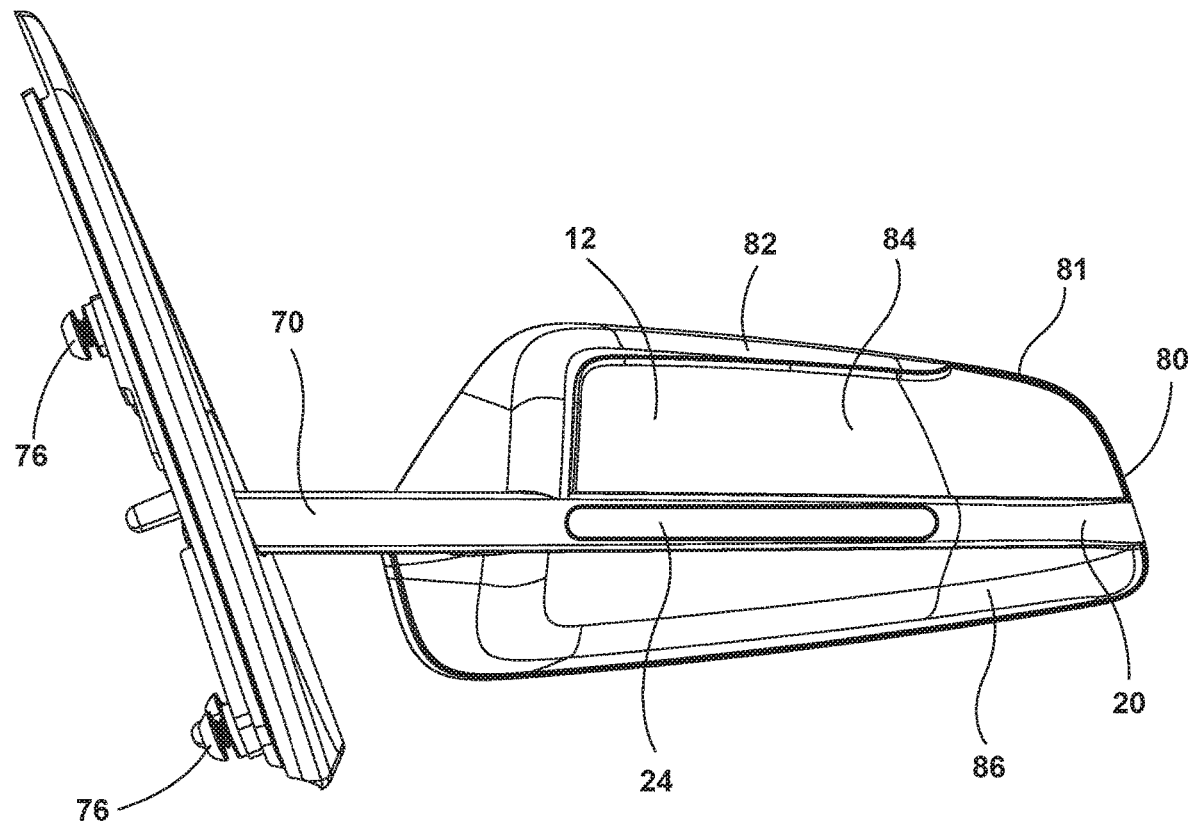
FIG. 3 is a rear elevational view of the rearview assembly of FIG. 1.
Figure 4:
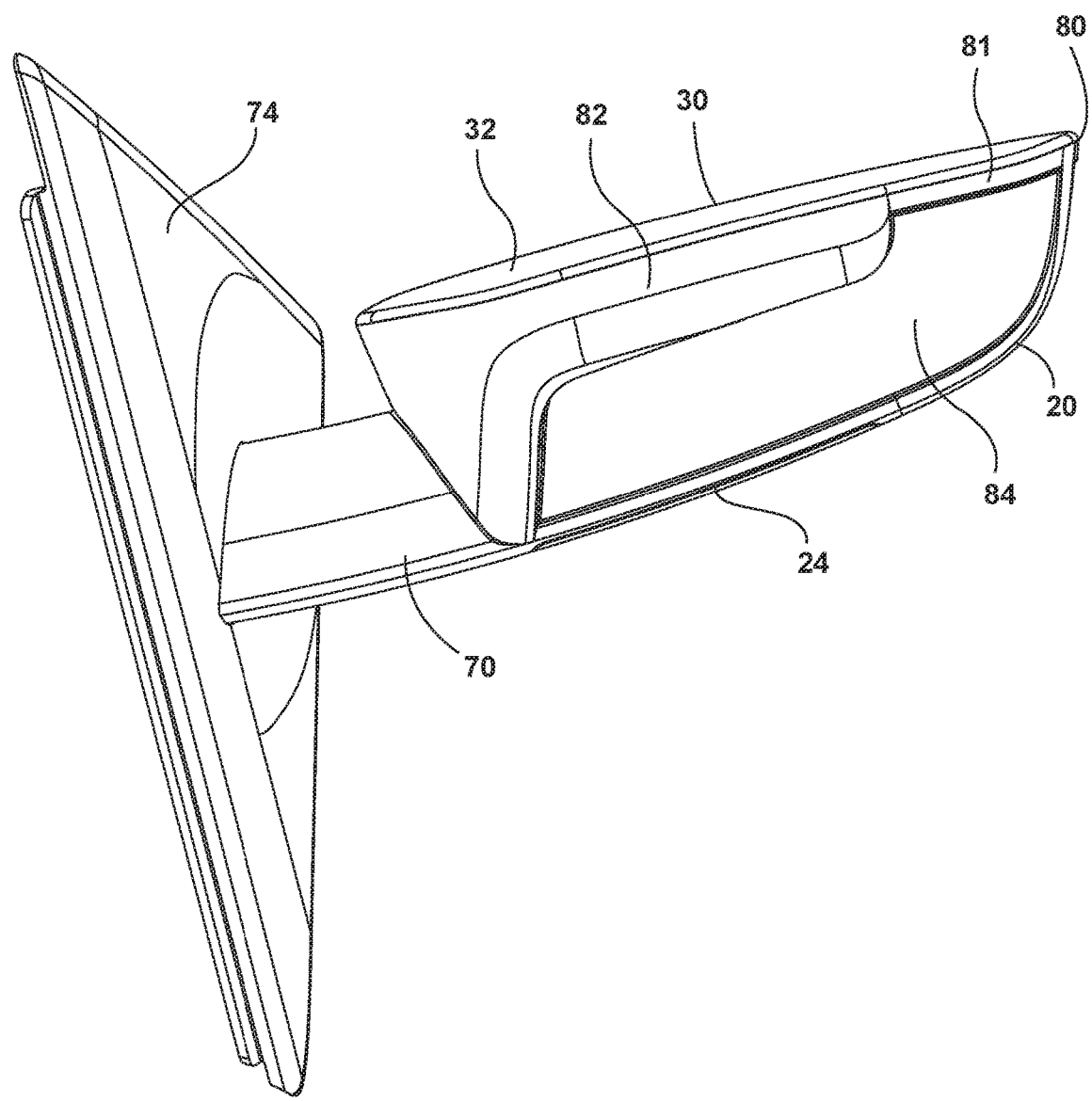
FIG. 4 is a top plan view of the rearview assembly of FIG. 1.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 7:
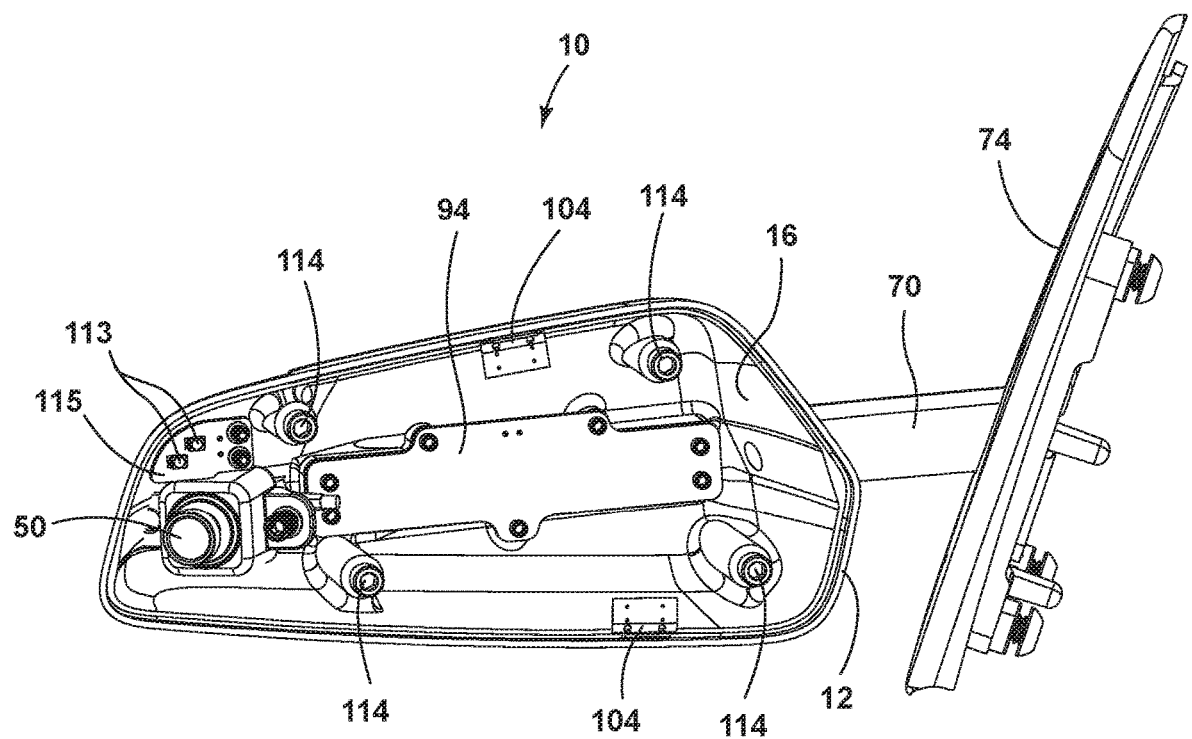
FIG. 7 is a front elevational view of the rearview assembly of FIG. 6 with the electro-optic device removed.
Figure 8:
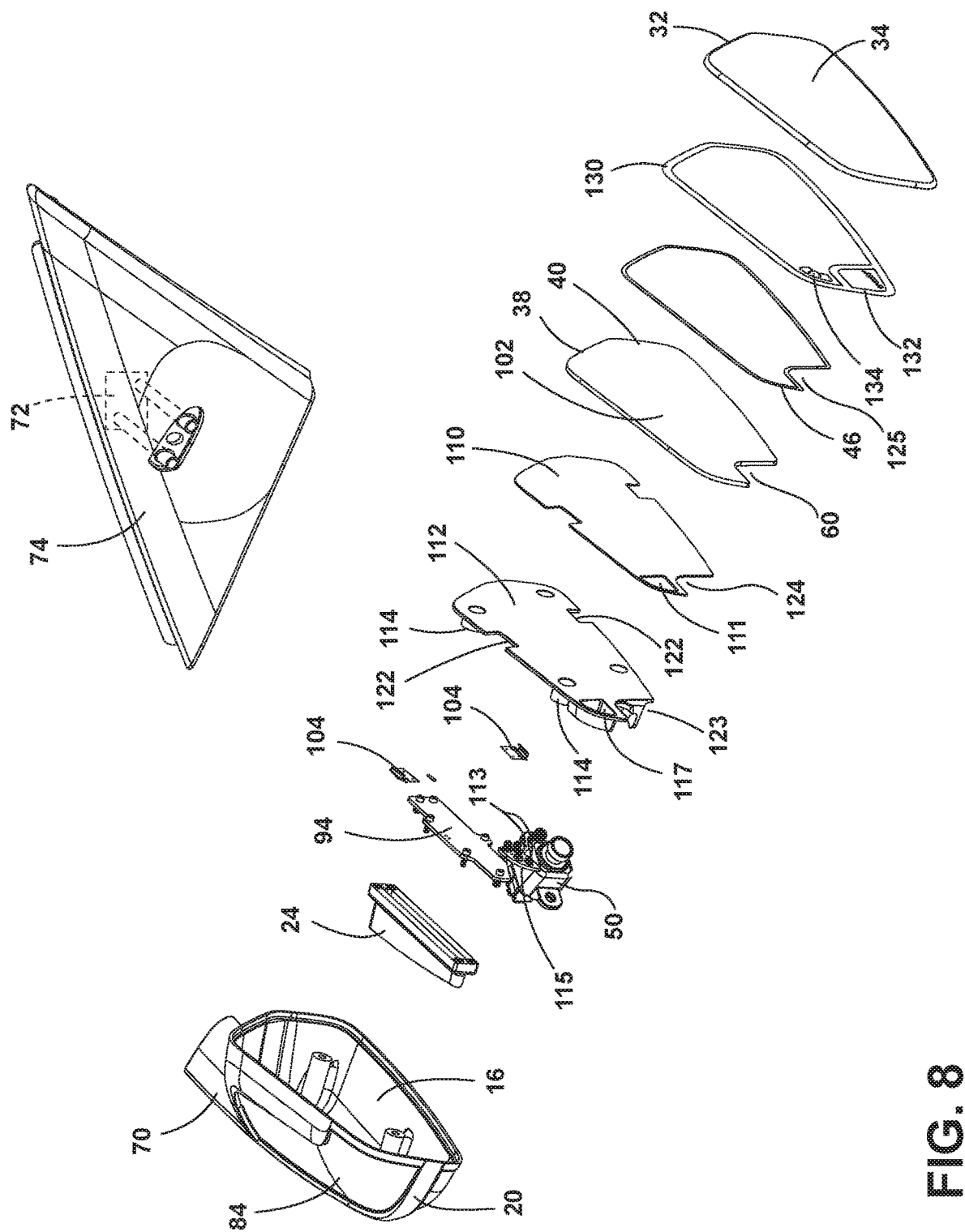
FIG. 8 is a top front exploded perspective view of a rearview assembly of the present disclosure.
Figure 9:
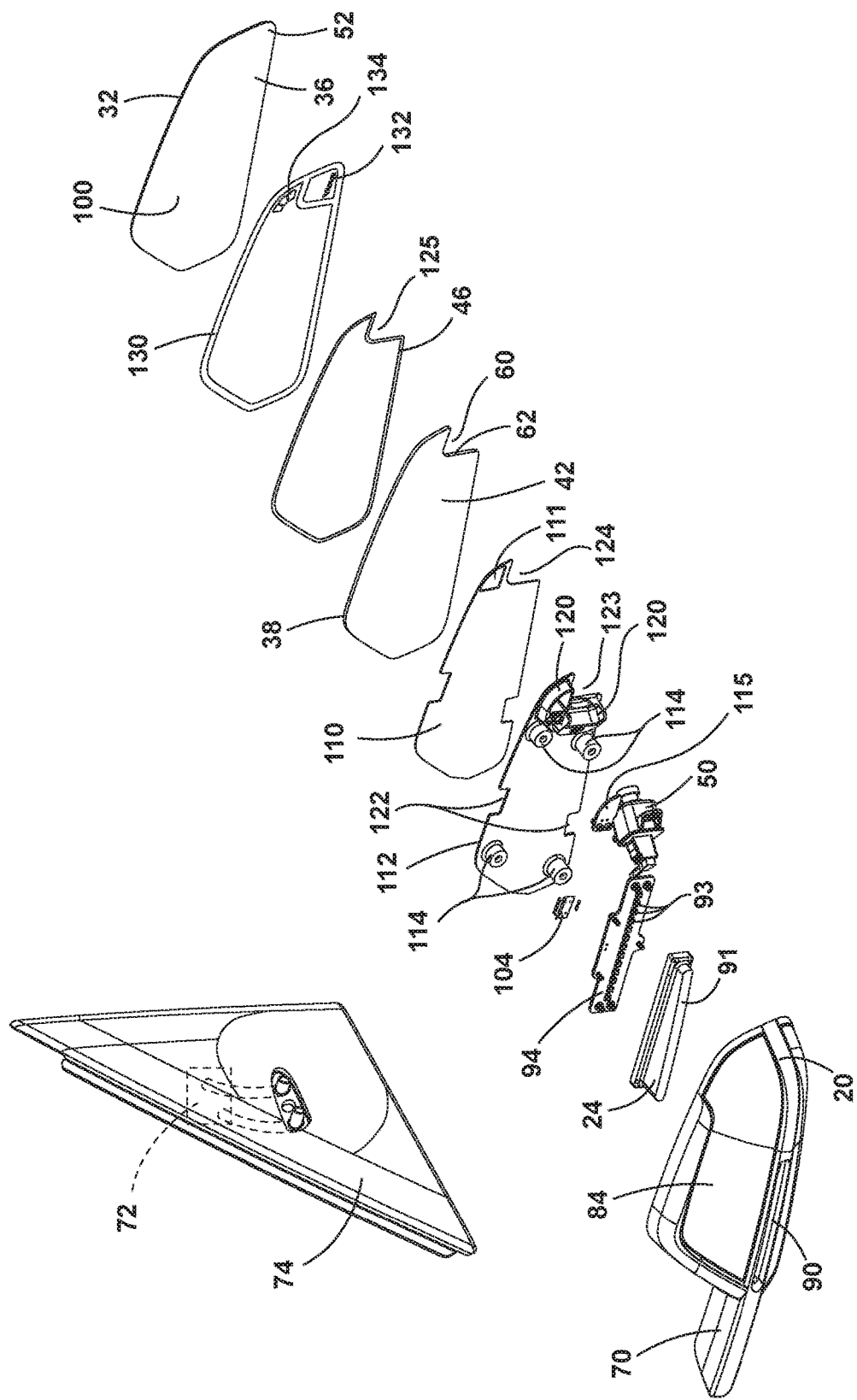
FIG. 9 is a rear top exploded perspective view of the rearview assembly of FIG. 8.

Referring to FIGS. 1-12, reference numeral 10 generally designates a rearview assembly for use with a vehicle 11 that includes a housing 12 having a front 14 defining an opening 16 (FIGS. 7 and 8). An external band 20 extends laterally about a rear 22 of the housing 12. A turn signal 24 is defined in the external band 20. An electro-optic device 30 includes a front substrate 32 defining a first surface 34 and a second surface 36. A rear substrate 38 defines a third surface 40 and a fourth surface 42. An electro-optic medium 44 is disposed between the front substrate 32 and the rear substrate 38. A peripheral seal 46 (FIG. 8) contains the electro-optic medium 44 between the front substrate 32 and the rear substrate 38. An imager 50 is adjacent the electro-optic device 30. A viewing window 52 (FIG. 10) is disposed on an outboard corner 54 of the electro-optic device 30. The imager 50 is in optical communication with the viewing window 52. The rear substrate 38 defines a recess 60 (FIGS. 8 and 9) at the viewing window 52. The imager 50 receives image data through the front substrate 32. The peripheral seal 46 follows at least a portion of a perimeter of the recess 60. In the illustrated embodiment, the peripheral seal 46 follows edges 62 defined in the rear substrate 38.

With reference again to FIGS. 1-5B, the housing 12 is operably coupled with an elongate arm 70 that may be coupled with a motor 72. The motor 72 is configured to move the elongate arm 70, and consequently, the housing 12, and the electro-optic device 30, between deployed and non-deployed positions. The elongate arm 70 is operably coupled with a base unit 74 that is operably coupled with the vehicle 11. It will be understood that the elongate arm 70 may be pivotally coupled with the base unit 74 and operable between deployed and retracted positions relative to the vehicle 11. The vehicle 11 may be an automobile, off-road vehicle, truck, etc. The base unit 74 includes a plurality of fasteners 76 (FIG. 3) configured to secure the base unit 74, the elongate arm 70, and the housing 12 to the vehicle 11. The elongate arm 70 is configured to integrally attach with the housing 12. The external band 20 that extends about a rear of the housing 12 is integrally formed with the elongate arm 70 and terminates at a rearward edge 80 of the front substrate 32. The external band 20 extends through a bezel 81, which extends around all or part of the electro-optic device 30. The housing 12 also includes an upper cover 82 that may be integral with or formed with the housing 12. The external band 20 projects outwardly from the housing 12 to define a rear upper wall 84 and a rear lower wall 86. The rear upper wall 84 and the rear lower wall 86 of the housing 12 may be formed from a variety of materials, including aluminum, plastic, carbon fiber, etc. In addition, the external band 20 provides an aperture 90 (FIG. 7) through which the turn signal 24 extends. The turn signal 24 is configured to activate sequentially when the vehicle 11 is making a turn in the direction of the rearview assembly 10 or when manually selected by the driver. The turn signal 24 is configured to provide a notification forward of the vehicle 11 that the vehicle 11 is turning and which direction the vehicle 11 is turning.

Figure 5:
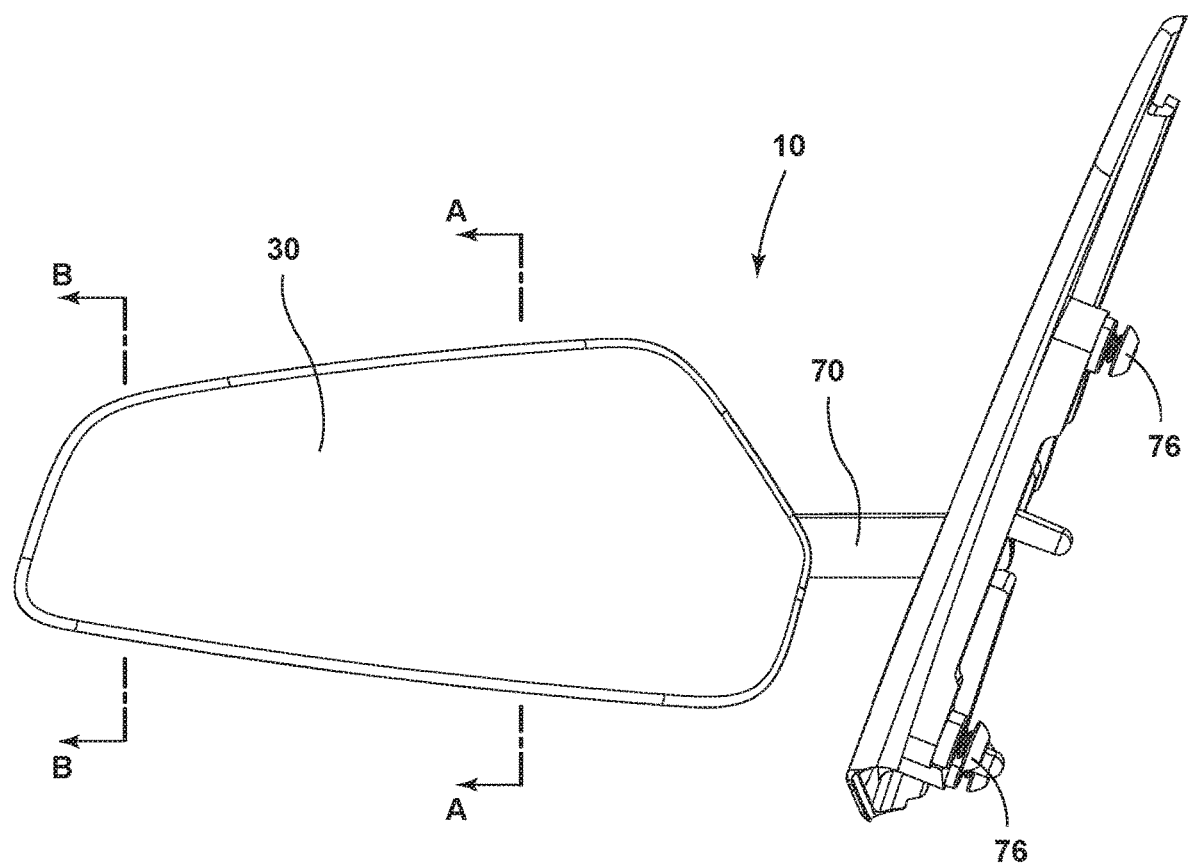
FIG. 5 is a front elevational view of the rearview assembly of FIG. 1.
Figure 5A:
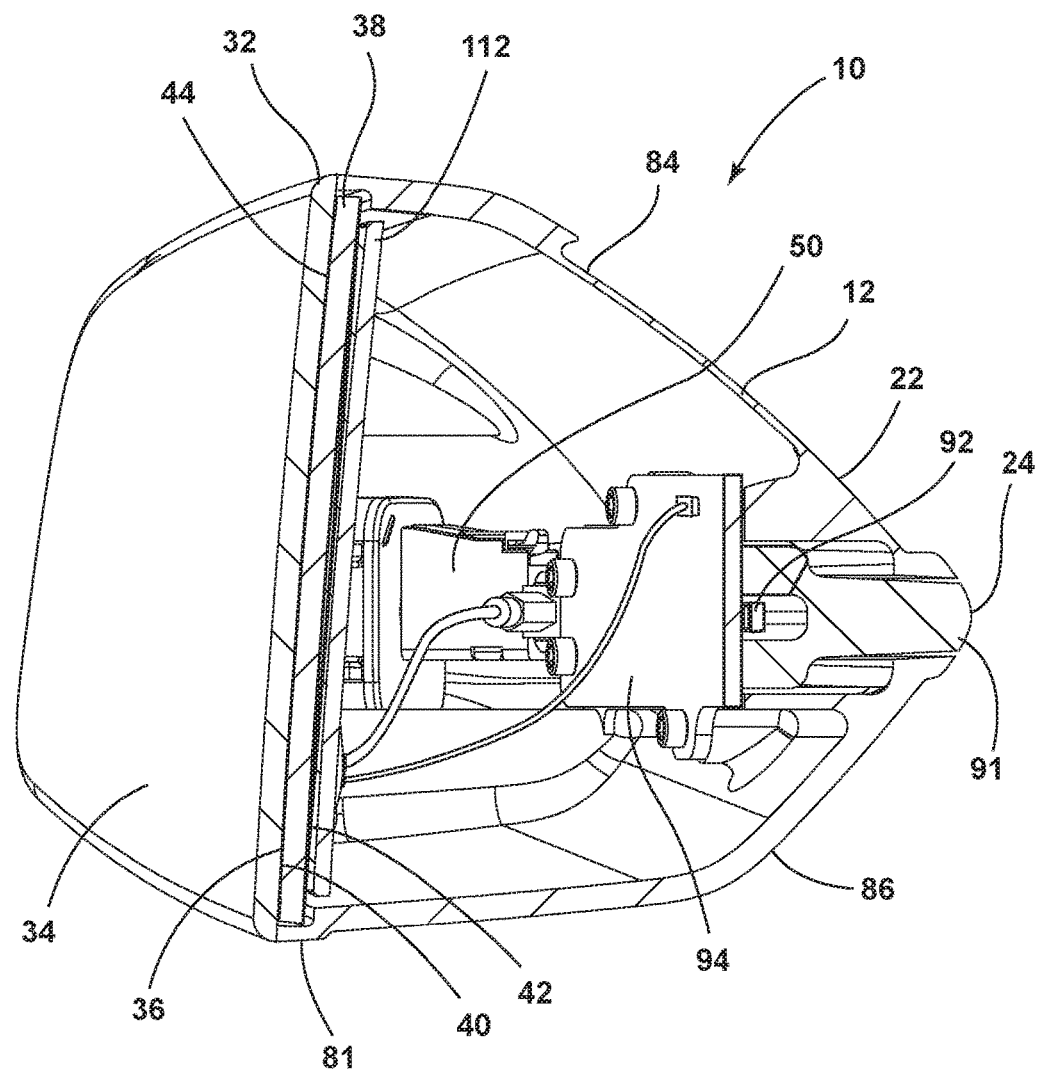
FIG. 5A is a side cross-sectional view taken at line A-A of FIG. 5.
Figure 5B:
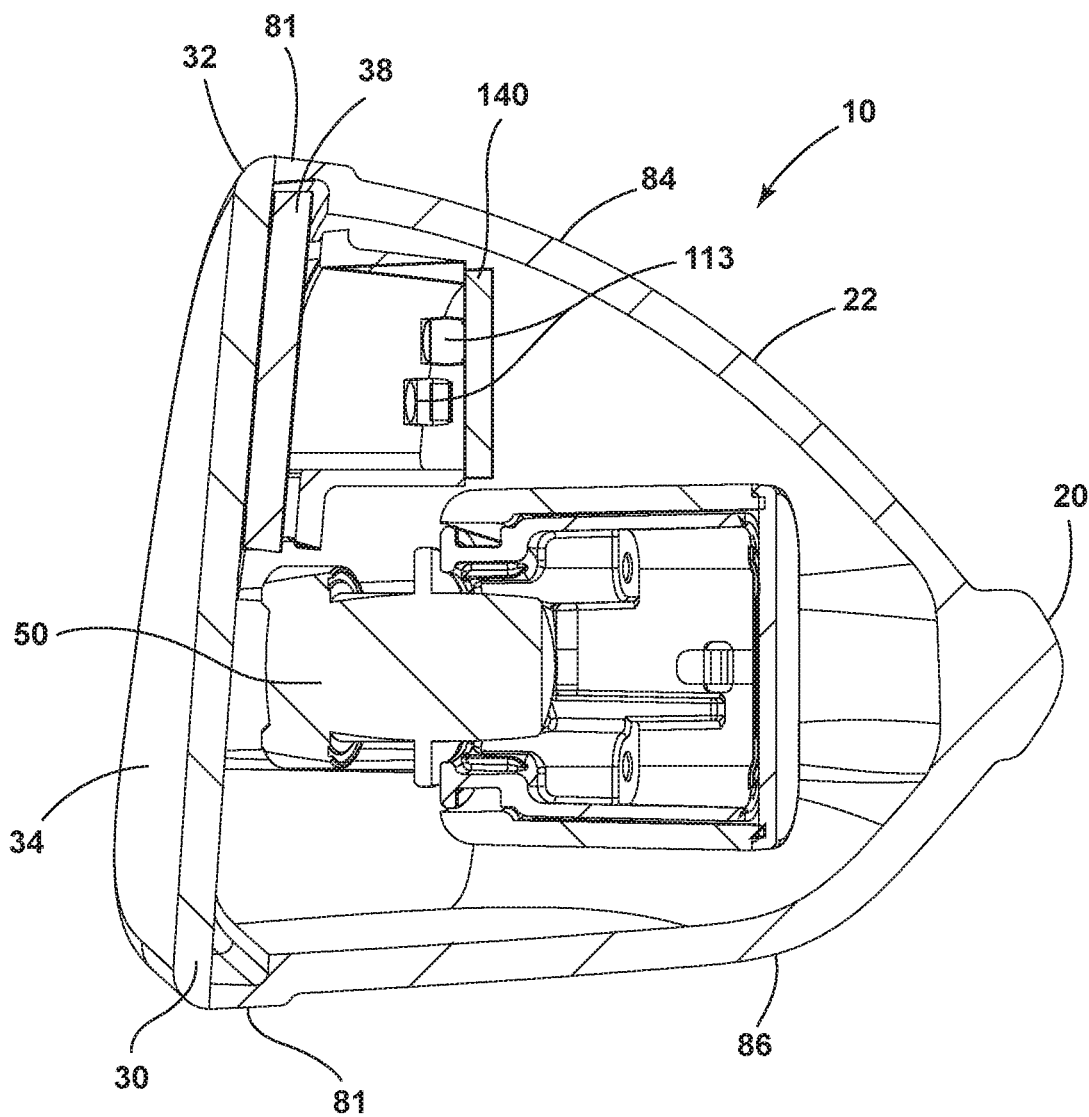
FIG. 5B is a side cross-sectional view taken at line B-B of FIG. 5.
Figure 6:
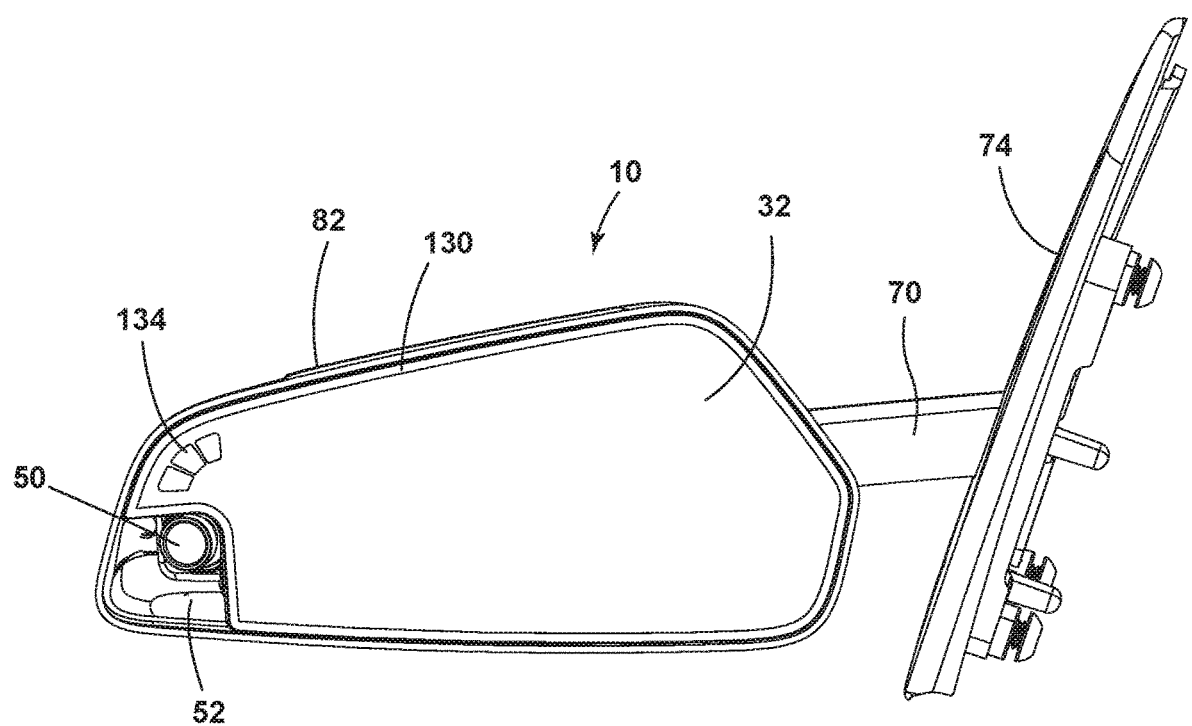
FIG. 6 is a front elevational view of a rearview assembly of the present disclosure showing an imager and graphics of the assembly.

As shown in FIG. 5A, the turn signal 24 includes a cover 91 that extends over a light source 92 that is configured to emit light into the cover 91 which can be seen externally. The light source 92 may be one or more incandescent bulbs. Alternatively, the light source 92 may include a plurality of linearly aligned light emitting diodes, such as light emitting diodes 93, that can activate in unison or sequentially.

With reference now to FIGS. 5-9, the rearview assembly 10 includes a multitude of internal features configured to aid the driver during operation of the vehicle 11. For example, the electro-optic device 30 is configured to dim to minimize glare to a driver during operation of the vehicle 11. The electro-optic medium 44 generally functions as a media of variable transmittance, and when electrically energized, darkens and begins to absorb light. The more light the electro-optic medium 44 absorbs, the darker the electro-optic device 30, and consequently, the rearview assembly 10, becomes. As a result, the glare associated with bright lights that are reflected toward a driver by the rearview assembly 10 is lessened. When the electrical voltage applied to the electro-optic medium 44 is decreased to zero or close to zero, the electro-optic device 30 returns to a clear or almost clear state. It is also contemplated that, in some instances, the electro-optic device 30 could work in reverse where the application of electrical voltage clears the electro-optic device 30 and lessening of the electrical voltage darkens the electro-optic device 30. The electro-optic medium 44 is disposed between the front substrate 32 and the rear substrate 38 and sealed between the front substrate 32 and rear substrate 38 by the peripheral seal 46. The electro-optic medium 44 may include an electrochromic material, or another electro-optic media having similar qualities may also be used. The unit can also be set to operate automatically. In this instance, circuitry, such as a printed circuit board (PCB) 94, can be utilized to sense light and effectively change the transmittance of the rearview assembly 10 when glare is detected. More specifically, the electro-optic medium 44 is activated and the rearview assembly 10 begins to dim (reflectance is lowered) in proportion to the amount of glare that is detected by the imager 50 or by a glare sensor operably coupled with the PCB 94. As the glare subsides, the electro-optic device 30 can return to a normal high reflectance state without manual interaction on the part of the driver. A conductive layer 100 (FIG. 9) and a conductive layer 102 (FIG. 8) are provided on the inside of the front and rear substrates 32, 38, on the second and third surfaces 36, 40, respectively. The conductive layer 100 on the front substrate 32 is generally transparent, while the conductive layer 102 on the rear substrate 38 may be transparent, or may be semi-transparent or even opaque, and may have reflective characteristics that function as a reflective layer for the electro-optic device 30. The conductive layers 100, 102 on both the front substrate 32 and the rear substrate 38 are operably coupled with electronic circuitry, which is effective to electrically energize the electro-optic medium 44, thereby switching the transmissivity of the electro-optic device 30 of the rearview assembly 10. J-clips 104 may be utilized to provide an electrical connection to the conductors disposed on the front substrate 32 and the rear substrate 38.

With reference again to FIGS. 8 and 9, the rearview assembly 10 includes a foam support or adhesive 110 configured to operably couple the fourth surface 42 with a carrier 112. The foam support or adhesive 110 defines an aperture 111 that allows optical communication of light sources 113 disposed on an internal support or PCB 115 through the foam support or adhesive 110. The PCB 115 is positioned above the imager 50 such that the light sources 113 can emit light through an aperture 117 defined in the carrier 112, through the aperture 111, and through the electro-optic device 30. The carrier 112 includes a plurality of mechanical fastener mounts 114 to secure the carrier 112, and consequently, the electro-optic device 30, to the housing 12. In addition, the carrier 112 includes robust supports 120 configured to maintain the imager 50 at a particular angle relative to the electro-optic device 30. Cutouts 122 provide access for the J-clips 104 to reach the space occupied by the electro-optic medium 44 between the front substrate 32 and the rear substrate 38. The imager 50 is configured to collect image data through the front substrate 32. The imager 50 is aligned with the recess 60 defined in the rear substrate 38 as well as a recess 123 in the carrier 112, a recess 124 in the foam support or adhesive 110, and a recess 125 defined by the peripheral seal 46. The front substrate 32 may be at least partially reflective at the viewing window 52 to at least partially conceal the imager 50.

With reference again to FIGS. 8 and 9, the electro-optic device 30 also includes a graphic 130. The graphic 130 may be a reflective ring or chrome ring and may extend about a periphery of the viewing window 52. In addition, the graphic 130 may be disposed proximate the periphery of the electro-optic device 30. The graphic 130 may be disposed anywhere within the stack of the electro-optic device 30 or elsewhere. In the illustrated embodiment, the graphic 130 is located proximate the second surface 36. The graphic 130 could also be etched using chemicals, lasers, mechanical devices, etc., into one or more surfaces of the front and rear substrates 32, 38. The graphic 130 may define an opening 132 that is in optical communication with the window 52 and which provides a viewing area to the imager 50. In addition, the graphic 130 could also include etched indicia 134 that may function to communicate information to a driver. The indicia 134 may function as a blind spot indicator, turn signal indicator, etc., which may be illuminated by the light sources 113 supported on PCB 115 (FIG. 7). Accordingly, it is contemplated that the indicia 134, when illuminated, will be visible by a driver of the vehicle 11 or by a following vehicle. The indicia 134 could also be used as a decoration and include coloration that generally matches a decorative pattern of the vehicle 11. In the illustrated embodiment of FIGS. 6 and 7, the seal 46 generally follows inside edges of the recess 60. Thus, the seal 46 follows an outer perimeter of the rear substrate 38 and not an outer perimeter of the front substrate 32. It will be understood by a person having ordinary skill in the art that this configuration could vary.

Figure 10:
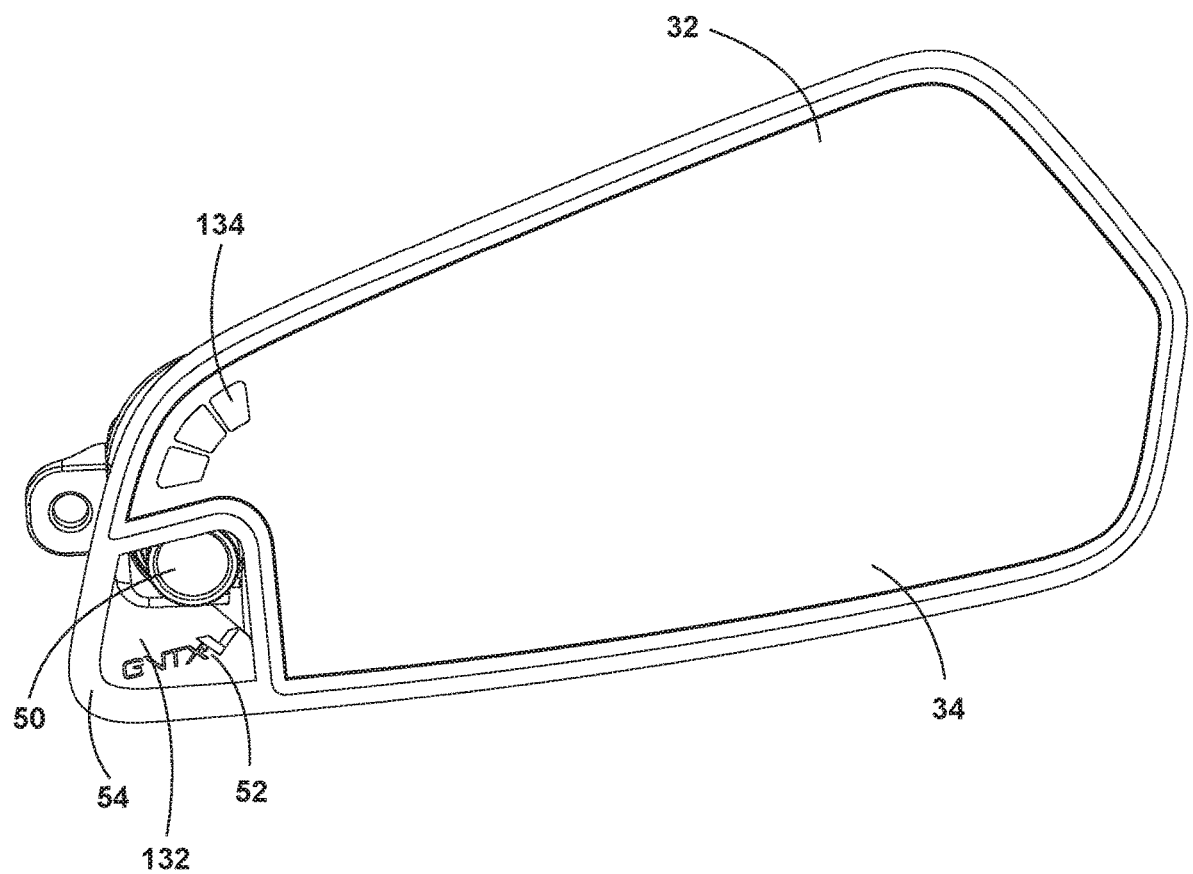
FIG. 10 is a top perspective view of an electro-optic assembly and imager of the present disclosure.
Figure 11:
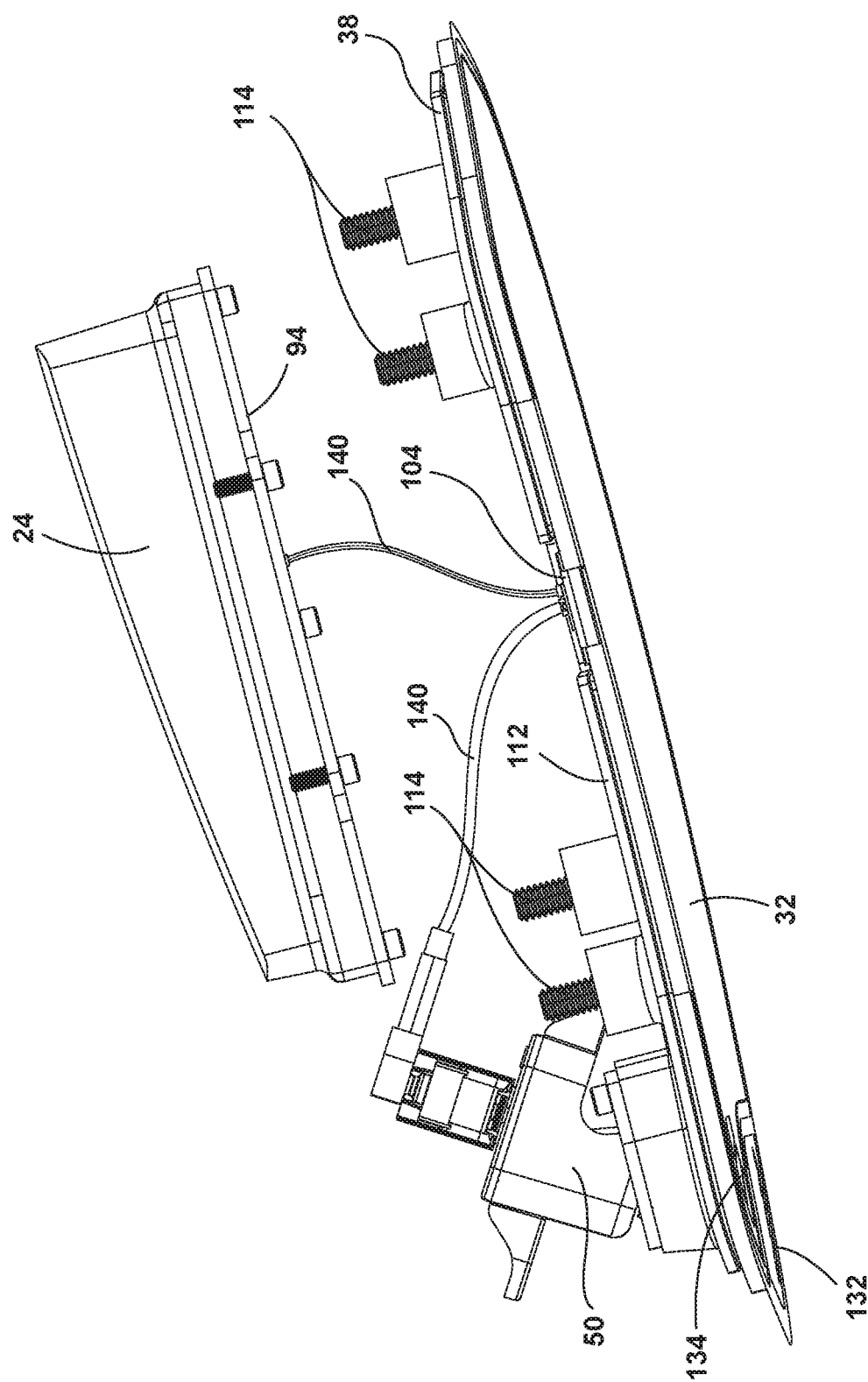
FIG. 11 is a top plan view of an electro-optic assembly, imager, and turn signal of the present disclosure.
Figure 12:
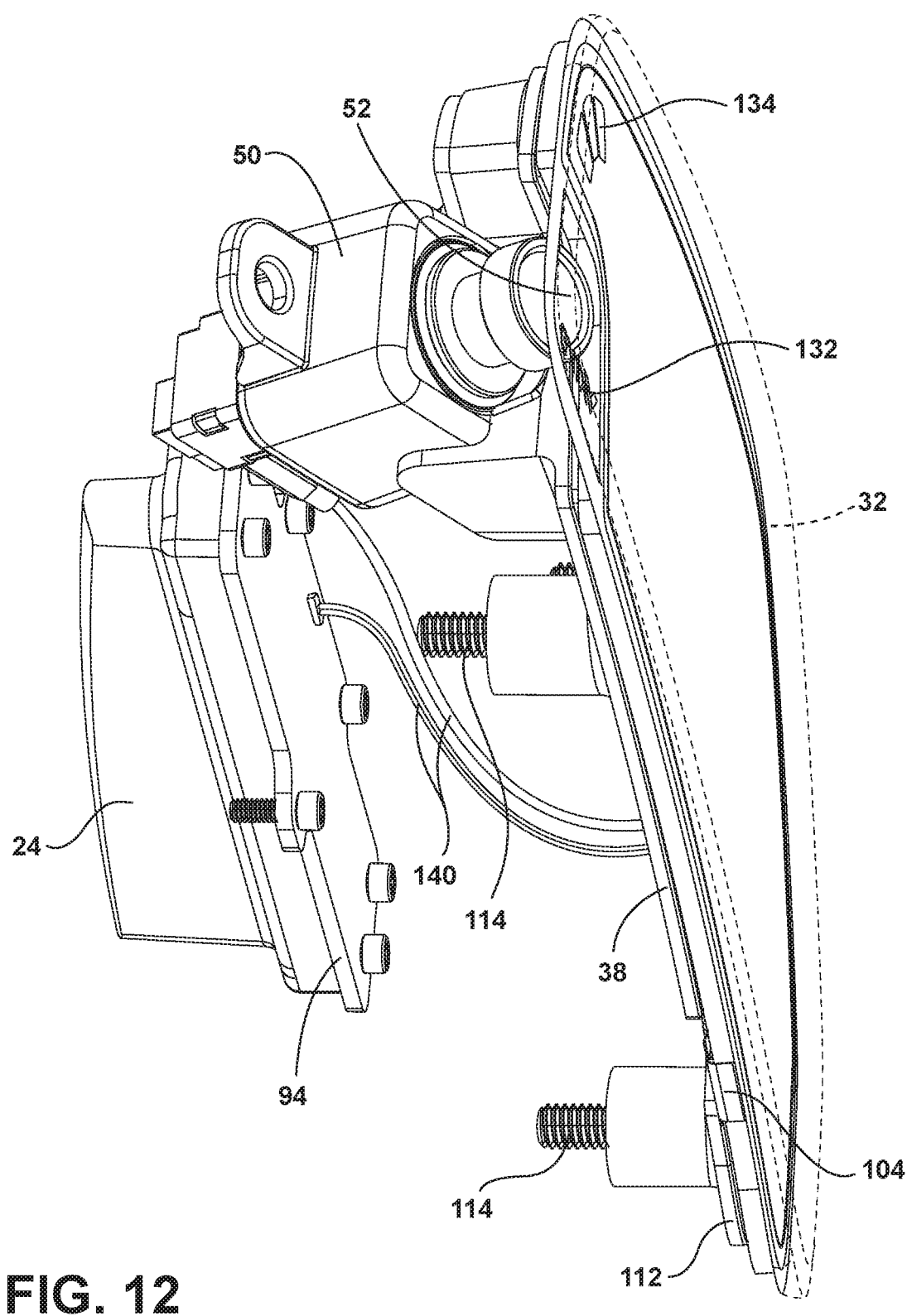
FIG. 12 is a bottom perspective view of the electro-optic assembly, imager, and turn signal of FIG. 11.

With reference now to FIGS. 10-12, the electro-optic device 30 is configured for use with the imager 50 and the PCB 94. The PCB 94 is operably coupled with the turn signal 24, as well as the imager 50, and configured to provide operating instructions for both. The PCB 94, the imager 50, and the electro-optic device 30 may be electrically coupled via a ribbon connector or wiring 140 or via another suitable method. The imager 50 is disposed behind the electro-optic device 30 and is set at an angle relative to the electro-optic device 30, as shown in FIGS. 11 and 12. The imager 50 is in close proximity to the second surface 36 of the front substrate 32. As illustrated, the imager 50 receives image data through the viewing window 52 at the recess 60 defined in the rear substrate 38. Accordingly, the imager 50 can be positioned very close to the second surface 36 of the front substrate 32, an area that would otherwise be occupied by the rear substrate 38. Moreover, because the imager 50 is disposed at an outboard corner of the rearview assembly 10 as a whole, an even better viewing angle can be maintained. As illustrated, the PCB 94 is disposed directly in front of the turn signal 24 and may be in abutting contact therewith. Additionally, the PCB 94 may be mechanically fastened with the turn signal 24. The angle of the imager 50 is maintained by supports that extend around the viewing window 52. The imager 50 is generally configured to capture image data and includes a field of view that covers a blind spot zone of the vehicle 11. In addition, mechanical fasteners are disposed on a rear portion of the carrier 112, and are configured to secure the rear portion of the carrier 112 with the housing 12.

The rearview assembly as set forth herein provides a robust construction capable of movement between deployed and retracted positions. The rearview assembly also includes a PCB that may control a forward turn signal light, a blind spot indicator, and an imager that collects image data rearward of the vehicle. The imager may be operably coupled with the PCB and the blind spot indicator such that when a following vehicle is present in the blind spot of the vehicle, the PCB can activate light sources of the blind spot indicator to inform the driver of the vehicle. In addition, the external band provides an aesthetically pleasing feature around the housing, and also provides additional protection to the remainder of the housing and the components disposed within the housing. The rearview assembly set forth herein is an improvement over traditional constructions and provides useful safety features that minimize the likelihood of a collision event during travel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
   a housing having a front defining an opening;
   a carrier secured to the housing, the carrier comprising a first imager viewing region and a first aperture;
   an electro-optic device secured to the carrier, the electro-optic device including:
      a front substrate defining a first surface and a second surface;
      a rear substrate defining a third surface and a fourth surface;
      an electro-optic medium disposed between the front substrate and the rear substrate;
      a peripheral seal containing the electro-optic medium between the front substrate and the rear substrate;
      a graphic proximate to the second surface, the graphic including an indicia;
      a second imager viewing region comprising:
         a portion of the front substrate; and
         a recess in the rear substrate, the recess comprising an area where the second substrate would otherwise be present;
   an imager operable to collect image data through the first and second viewing regions and disposed rearward relative the front substrate; and
   a light source operable to emit light though the first aperture and the electro-optic device in optical communication with the indicia.

2. The rearview assembly of claim 1, wherein the rear substrate defines a recess at the second imager viewing region.

3. The rearview assembly of claim 2, wherein the peripheral seal follows at least a portion of a perimeter of the recess.

4. The rearview assembly of claim 1, wherein:
   the graphic is disposed between the front substrate and the rear substrate.

5. The rearview assembly of claim 1, wherein the indicia communicates information to a driver, the indicia disposed above the imager second viewing region.

6. The rearview assembly of claim 4, wherein the graphic extends about a periphery of the second imager viewing region.

7. The rearview assembly of claim 1, wherein the front substrate is at least partially reflective at the second imager viewing region, to at least partially conceal the imager.

8. The rearview assembly of claim 1, wherein the imager includes a field of view that covers a blind spot zone of a vehicle.

9. A rearview assembly comprising:
   a housing having a front defining an opening;
   a carrier disposed within and secured to the housing, the carrier comprising an aperture;
   an electro-optic secured to the carrier, the electro-optic comprising a front substrate and a rear substrate, the electro-optic device having a first region and a second region, the first region operable between a darkened state and a clear state, wherein the rear substrate does not extend into the second region;
   an imager disposed rearward, relative the electro-optic device and operable to collect image data, wherein the imager is in optical communication with the second region; and
   a light source operable to emit light through the aperture and the electro-optic at the second region.

10. The rearview assembly of claim 9, further comprising:
    a graphic disposed between the front substrate and the rear substrate of the electro-optic device.

11. The rearview assembly of claim 10, wherein:
    the graphic includes indicia that communicates information to a driver the indicia disposed above the imager; and
    the light source is operable to illuminate the indicia.

12. The rearview assembly of claim 10, wherein the graphic extends about a periphery of the second region.

13. The rearview assembly of claim 10, wherein the front substrate is at least partially reflective at the second region, to at least partially conceal the imager.

14. The rearview assembly of claim 9, wherein the imager includes a field of view that covers a blind spot zone of a vehicle.

15. An external rearview assembly for a vehicle comprising:
    a housing;
    a carrier secured to and disposed within the housing, the carrier comprising a first recess;
    an electro-optic secured to the carrier plate, the electro-optic device including a front substrate and a rear substrate wherein the rear substrate defines a second recess and at the second recess, a portion of the front substrate is present and an area that would otherwise be occupied by the rear substrate is present, the second recess disposed on an outboard corner of the electro-optic device; and
    an imager disposed rearward the electro-optic device and carrier, the imager operable to collect image data through:
       the carrier at the first recess; and
       the electro-optic device at the second recess of the rear substrate.

16. The external rearview assembly of claim 15, further comprising:
    a turn signal defined in an external band.

17. The external rearview assembly of claim 16, wherein the turn signal includes a plurality of linearly aligned light emitting diodes.

18. The external rearview assembly of claim 15, wherein the imager includes a field of view that covers a blind spot zone of a vehicle.

19. The external rearview assembly of claim 15, wherein a graphic includes indicia that communicates information to a driver and which is disposed above the imager.

20. The external rearview assembly of claim 15, further comprising:
    a light source;
    wherein:
       the carrier further comprises an aperture, and the light source is operable to operable to emit light through the carrier at the aperture and the electro-optic at the second recess.

\* \* \* \* \*